(12) United States Patent
Linde et al.

(10) Patent No.: US 11,618,574 B2
(45) Date of Patent: Apr. 4, 2023

(54) HEATABLE LEADING-EDGE APPARATUS, LEADING-EDGE HEATING SYSTEM AND AIRCRAFT COMPRISING THEM

(71) Applicant: Airbus Operations GmbH, Hamburg (DE)

(72) Inventors: Peter Linde, Hamburg (DE); Maximilian Schutzeichel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 974 days.

(21) Appl. No.: 16/430,633

(22) Filed: Jun. 4, 2019

(65) Prior Publication Data

US 2019/0382119 A1   Dec. 19, 2019

(30) Foreign Application Priority Data

Jun. 19, 2018 (DE) .................. 102018004814.5

(51) Int. Cl.
*B64D 15/12* (2006.01)
*H05B 3/00* (2006.01)
*H05B 3/14* (2006.01)
*H05B 3/18* (2006.01)
*B64D 45/00* (2006.01)

(52) U.S. Cl.
CPC .......... *B64D 15/12* (2013.01); *H05B 3/0023* (2013.01); *H05B 3/145* (2013.01); *B64D 2045/009* (2013.01); *H05B 3/18* (2013.01); *H05B 2203/035* (2013.01); *H05B 2214/02* (2013.01)

(58) Field of Classification Search
CPC .... B64D 15/12; B64D 2045/009; B64G 1/58; B64G 1/50; H05B 3/0014; H05B 3/145; H05B 3/34; H05B 3/342; H05B 3/345; H05B 3/0042; H05B 3/0023; H05B 3/18; H05B 2203/011; H05B 2203/017; H05B 2203/002; H05B 2203/003; H05B 2203/004; H05B 2203/01;
(Continued)

(56) References Cited

U.S. PATENT DOCUMENTS 8,931,740 B2   1/2015 Nordin et al.
9,511,871 B2  12/2016 Steinwandel et al.
(Continued)

FOREIGN PATENT DOCUMENTS

DE   102007061548 A1   7/2008
DE   102011119844 A1  12/2012
(Continued)

OTHER PUBLICATIONS

German Search Report; priority document.

*Primary Examiner* — Shawntina T Fuqua
(74) *Attorney, Agent, or Firm* — Greer, Burns & Crain, Ltd.

(57) ABSTRACT

A heatable leading-edge apparatus for an aircraft having a main structure and a heating layer. The heating layer comprises a fiber composite layer with fibers and with a matrix which surrounds the fibers. The fibers are at least partially formed as conducting fibers, such as carbon fibers, with an electrically insulating coating. Owing to the conducting fibers, which act as electrical heating elements, a desired surface temperature can be established on an outer side of the leading-edge apparatus.

16 Claims, 2 Drawing Sheets

(58) Field of Classification Search
CPC ........ H05B 2203/013; H05B 2203/036; H05B 2203/035; H05B 2214/04; H05B 2214/02
See application file for complete search history.

(56) References Cited

U.S. PATENT DOCUMENTS

| | | |
|---|---|---|
| 2011/0180524 A1 | 7/2011 | Brittingham et al. |
| 2015/0129720 A1 | 5/2015 | Strobl et al. |
| 2016/0021704 A1* | 1/2016 | Elverud .................. H05B 3/58 252/502 |
| 2017/0332443 A1 | 11/2017 | Linde |
| 2018/0014357 A1* | 1/2018 | Christy .................. H05B 3/03 |
| 2018/0057176 A1 | 3/2018 | Kinlen et al. |
| 2020/0238576 A1* | 7/2020 | Christy .................. H05B 3/34 |

FOREIGN PATENT DOCUMENTS

| | | | |
|---|---|---|---|
| EP | 2873617 A1 | 5/2015 | |
| EP | 3244692 A1 | 11/2017 | |
| EP | 3290341 A1 | 3/2018 | |
| GB | 2445458 A * | 7/2008 | ................ C08J 3/18 |
| WO | 2011087412 A1 | 7/2011 | |
| WO | WO-2016126827 A1 * | 8/2016 | ........... C01B 32/158 |
| WO | WO-2021259896 A1 * | 12/2021 | ........... F24D 13/024 |

\* cited by examiner

HEATABLE LEADING-EDGE APPARATUS, LEADING-EDGE HEATING SYSTEM AND AIRCRAFT COMPRISING THEM

CROSS-REFERENCES TO RELATED APPLICATIONS

This application claims the benefit of the German patent application No. 10 2018 004 814.5 filed on Jun. 19, 2018, the entire disclosures of which are incorporated herein by way of reference.

FIELD OF THE INVENTION

The invention relates to a heatable leading-edge apparatus for an aircraft, to a leading-edge heating system and also to an aircraft with a leading-edge apparatus of said kind and, respectively, a leading-edge heating system of said kind.

BACKGROUND OF THE INVENTION

Components of aircraft which are directed directly into an air incident flow may be susceptible to icing under certain environmental conditions and flight situations. The prior art discloses numerous apparatuses which can nevertheless result in an ice-free state of these components. For example, apparatuses which prevent ice from adhering in the first place (so-called anti-icing) are known. Furthermore, apparatuses which can remove ice which is already adhering (so-called de-icing) are known. The apparatuses can be based on the introduction of heat, for example by means of bleed air which is drawn from compressor stages of a turbojet engine. Apparatuses in which ice is dislodged by actively deforming leading-edge regions, for example using pneumatically expandable pads composed of an elastomer, are also known.

In modern commercial aircraft, the use of bleed air is becoming increasingly limited. Therefore, apparatuses which can generate heat in a different way also exist. It is known, for example, to arrange heating mats with an electrical resistance heating arrangement on an inner side of leading edges of flow components in order to generate and emit heat locally.

EP 2 873 617 A1 discloses an apparatus for de-icing and/or preventing ice formation for an aircraft which has a heat-emitting device for emitting heat to a surface region of the aircraft, which heat-emitting device is designed for linear heat emission for the purpose of generating a predetermined breaking point or predetermined breaking line or separating line in ice which accumulates on the surface region.

SUMMARY OF THE INVENTION

An object of the present invention is to propose a leading-edge apparatus which is designed for local heating in an alternative and improved way and which has as a low weight.

This object of the invention is achieved by a heatable leading-edge apparatus for an aircraft, comprising: a leading-edge main structure, a heating layer, wherein the heating layer comprises a fiber composite layer with fibers and with a matrix which surrounds the fibers, wherein the fibers are at least partially formed as conducting fibers, and wherein the conducting fibers are designed and configured as carbon fibers with an electrically insulating coating.

According to the invention, the conducting fibers are integrated in the leading-edge apparatus, wherein a power source can be applied to the ends of the fibers in order to conduct a heating current through the fibers. Due to the electrically insulating coating of the conducting fibers, leakage currents or similar effects can be completely avoided since the insulated fibers may touch each other without this resulting in a leakage current. Such coatings of carbon fibers can be produced with a very high temperature resistance of up to over 700 degrees Celsius in a relatively cost-effective and time-efficient manner even in mass production. A further advantage of the invention is obtained by virtue of the carbon fibers of the conducting fibers being able to serve directly as reinforcing fibers of the fiber composite layer and to a certain extent forming a natural constituent part of the fiber composite layer without discontinuities or electro-chemical reactions occurring. The electrically insulating coating can furthermore be selected in such a way that there are no adverse effects on the bonding behavior, i.e., the conducting fibers have a bonding behavior similar to uncoated carbon fibers.

In principle, the conducting fibers can be processed and treated in the production of the fiber composite in just the same way as uncoated carbon fibers which are usually used. Furthermore, the conducting fibers can even act directly as reinforcing fibers of the fiber composite component. The fibers of the fiber composite layer can also be designed as reinforcing fibers.

Not all of the fibers of the leading-edge apparatus according to the invention have to be designed as conducting fibers, that is to say, as carbon fibers with an electrically insulating coating. It may also be the case that only a certain proportion of the fibers in the fiber composite layer are designed as conducting fibers and another proportion of the fibers are designed conventionally, that is to say, for example, as fibers through which current does not flow (i.e., without an insulating coating and/or in the form of an electrically non-conducting glass fiber). The conducting fibers according to the invention are generally firm or solid fibers (that is to say, with a continuous conducting cross section). In principle, however, conducting fibers according to the invention which have a cavity along their longitudinal fiber direction (hollow fibers) are also conceivable.

The leading-edge main structure of the leading-edge apparatus according to the invention can comprise, for example, a plurality of fiber composite structures, such as one or more fiber composite layers (e.g., prepregs, etc.) in order to ensure a fundamental strength of the leading-edge main structure. The leading-edge main structure of the leading-edge apparatus according to the invention can, for example, also comprise a layer with a honeycomb structure. Honeycomb structures of this kind can lend additional structural strength to the leading-edge apparatus.

Heat is uniformly generated in the heating layer by the conducting fibers. The heating layer is typically arranged on the outside of the leading-edge apparatus. The leading-edge apparatus according to the invention can be at least one component of a wing or of a tail unit of the aircraft.

The leading-edge apparatus according to the invention can be produced, for example, using a method comprising the following steps: arranging the leading-edge main structure, the heating layer and possibly a protective layer or erosion layer one above the other, and jointly curing these elements, so that a leading-edge apparatus composite is formed. According to the invention, the carbon fibers of the conducting fibers act not only as heating elements but at the same time also as reinforcing elements of the fiber composite layer or of the entire leading-edge apparatus.

A preferred embodiment is characterized in that the conducting fibers form one or more closed electrical circuits. Consequently, in an advantageous way according to the invention, a heating current can be conducted through the conducting fibers. Leakage currents are avoided owing to the electrically insulating coating. The insulated fibers can readily touch without this resulting in a short circuit.

In a likewise preferred embodiment, the insulating coating is a polymer coating, in particular a polymer electrolyte coating. The coating can be designed, in particular, as a solid polymer electrolyte coating. For example, the polymer electrolyte coating can contain a methoxy polyethyleneglycol monomethacrylate. Polymer electrolyte coatings of this kind can have a temperature resistance of at least 700 degrees Celsius, but at the same time offer outstanding bonding properties for incorporation into fiber-reinforced components, e.g., into a carbon-fiber-reinforced thermoplastic.

Also preferred is an embodiment in which the form of the arrangement of the conducting fibers in the fiber composite layer is selected from the group: individual fibers, fiber bundles, fiber tapes, laid fiber scrims, fiber mats, woven fiber fabric and nonwoven fiber fabric. The conducting fibers according to the invention can be arranged or integrated in different variants. The heating function according to the invention of the conducting fibers is still, in principle and advantageously, independent of the form of arrangement of the conducting fibers.

Furthermore preferred is a leading-edge apparatus which further comprises: a protective layer, in particular an outer erosion layer, which is arranged on the outside of the leading-edge apparatus. The protective layer serves mainly to protect against erosion and other adverse mechanical effects on the layer structure. The protective layer can comprise a lacquer, a paint, a protective metal layer or the like. It goes without saying that the protective layer can also be of multilayered construction.

A likewise preferred embodiment of the leading-edge apparatus is characterized in that the electrically insulating coating has a thickness in the range of from 0.1 micrometer to 1 micrometer. In particular, the electrically insulating coating can have a thickness of 0.5 micrometer. The electrically insulating coating fully surrounds the carbon fibers of the conducting fibers. In other words: the electrically insulating coating is applied to the carbon fibers. The carbon fibers can have, for example, a diameter of between 6 and 7 micrometers, so that a diameter of the conducting fibers of approximately 7 to 8 micrometers results.

The conducting fibers are preferably integrated in the fiber composite layer in such a way that the conducting fibers protrude out of the fiber composite layer at least at the ends. Since the conducting fibers project beyond the fiber composite layer at the ends, that is to say, at their respective ends, a power source can be connected to these ends in a simple manner.

The object is also achieved by a leading-edge heating system for an aircraft, comprising a leading-edge apparatus according to the invention and a power source for providing electrical heating power, wherein the power source is electrically connected to the leading-edge apparatus, in particular to the closed electrical circuit or circuits. The leading-edge heating system according to the invention substantially makes use of the same advantages as the leading-edge apparatus which can be heated according to the invention.

Also preferred is an embodiment of the leading-edge heating system which further has: a control unit with temperature sensors, wherein the heating power of the power source can be controlled by the control unit and the temperature sensors. In this way, the current which is conducted through the conducting fibers can be continuously adjusted if, on account of the predicted meteorological environmental conditions, anti-icing or de-icing is required before or during the flight.

The heating power is preferably selected in such a way that a surface temperature on an outer side of the leading-edge apparatus of between +1° C. and +10° C., in particular of between +3° C. and +6° C., is established. Given surface temperatures of this kind on the outer side of the leading-edge apparatus, ice formation is successfully suppressed. In order to select and to provide a corresponding heating power, environmental conditions (ambient air temperature, ambient atmospheric moisture, incident-flow speed) at which ice formation is typically possible (that is to say, a negative scenario to a certain extent) can be the starting point for example. Ice which is formed or deposited on surfaces of an aircraft which are subjected to flow can take different forms or structure. In general, a distinction is made between glaze ice, hard rime and mixed ice, wherein these forms of ice can occur on outer surfaces around which air flows given ambient air temperatures of between approximately −15° C. and approximately +5° C. In order to select and to provide a heating power for anti-icing and/or de-icing which leads to a surface temperature of between +1° C. and +10° C., in particular of between +3° C. and +6° C., a cruising incident-flow speed of the aircraft (typically at approximately 830 km/h) and an ambient air temperature of between approximately −15° C. and approximately +5° C. and also the ambient atmospheric moisture levels which generally occur during cruising can therefore be taken as a starting point, for example. In this way, anti-icing or de-icing can be ensured by the corresponding heating power dimensioning, in particular, given environmental conditions which promote ice formation. It goes without saying that ice formation can then also be suppressed under conditions which are less favorable for ice formation (for example drier ambient air or lower incident-flow speeds or higher ambient temperatures).

Finally, the object is likewise achieved by an aircraft with a leading-edge apparatus according to the invention or with a leading-edge heating system according to the invention. The aircraft according to the invention substantially makes use of the same advantages as the leading-edge apparatus which can be heated according to the invention and, respectively, the leading-edge heating system which can be heated according to the invention.

The above-described aspects and further aspects, features and advantages of the invention can likewise be found in the examples of the embodiment which is described below with reference to the appended drawings.

BRIEF DESCRIPTION OF THE DRAWINGS

In the figures, the same reference signs are used for elements, components or aspects which are the same or at least similar. It should be noted that there follows a detailed description of embodiments which are merely illustrative and not restrictive. In the claims, the word "having" does not exclude other elements and the indefinite article "a" or "an" does not exclude more than one. The fact that certain features are mentioned in various dependent claims alone does not restrict the subject matter of the invention. Combinations of these features can also be advantageously used. The reference signs in the claims are not intended to restrict the scope of the claims. The figures are not to be understood as true to scale but are merely of schematic and illustrative character. In the drawings

DETAILED DESCRIPTION OF THE PREFERRED EMBODIMENTS

Figure 1:
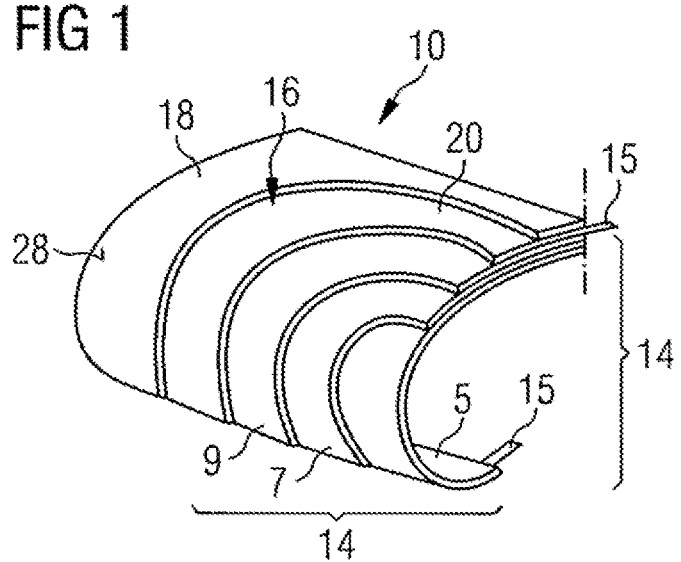
FIG. 1 shows a perspective view of a leading-edge apparatus according to the invention.

FIG. 1 shows a heatable leading-edge apparatus 10 for an aircraft 12. The leading-edge apparatus 10 has a leading-edge main structure 14 and a heating layer 16. The leading-edge apparatus 10 can further comprise a protective layer 18. The heating layer 16 has at least one fiber composite layer 20 which, for its part, has fibers and a matrix which surrounds the fibers (not illustrated in any detail). In addition to the at least one fiber composite layer 20, the heating layer 16 can, in principle, also have yet further fiber composite layers. These further fiber composite layers can be, for example, conventional glass-fiber-reinforced or carbon-fiber-reinforced plastics (GFRP or CFRP).

Figure 2:
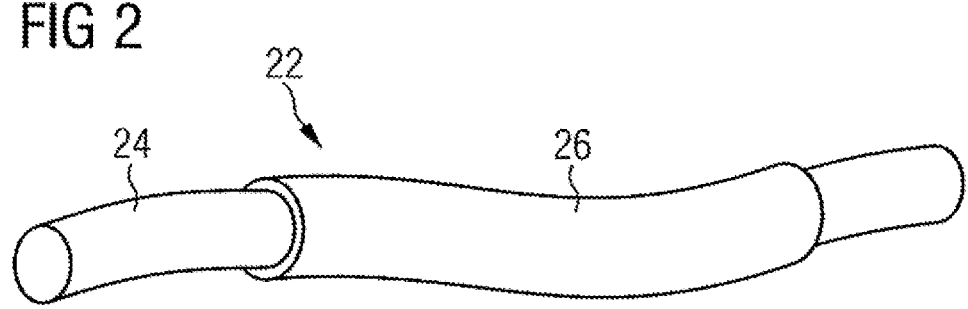
FIG. 2 shows a perspective view of a conducting fiber which is designed according to the invention.

In contrast to this, the fibers are at least partially designed as conducting fibers 22 in the at least one fiber composite layer 20 (cf. FIG. 2). To this end, the conducting fibers 22 are designed as carbon fibers 24 with an electrically insulating coating 26. The conducting fibers 22 can be used as electrical conductors and therefore as electrical heating elements for heating the leading-edge apparatus 10. In this case, the conducting fibers 22 are integrated into the leading-edge apparatus 10, wherein a power source 46 (cf. FIG. 3) can be applied to the conducting fibers 22 in order to conduct a heating current through the conducting fibers. Owing to the conducting fibers 22 which act as electrical heating elements, a desired surface temperature can be established on an outer side 28 of the leading-edge apparatus 10. Leakage currents are avoided on account of the electrically insulating coating 26 of the conducting fibers 22. The conducting fibers 22 are integrated in the fiber composite layer 20 in such a way that they protrude out of the fiber composite layer 20 beyond connection elements 15 at the end. The conducting fibers 22 can touch and in the process serve not only as electrical conductors but also as reinforcing fibers of the fiber composite layer 20 at the same time.

The leading-edge main structure 14 comprises a first fiber composite layer 5, a second fiber composite layer 7 and a third fiber composite layer 9. These fiber composite layers 5, 7, 9 can be, for example, conventional glass-fiber-reinforced or carbon-fiber-reinforced plastics (GFRP or CFRP). It goes without saying that the leading-edge main structure 14 can additionally also comprise yet further fiber composite layers. Furthermore, it is possible for the leading-edge main structure 14 to also have a honeycomb structure (not illustrated).

The protective layer 18, which can be designed as an outer erosion layer, for example, and which is arranged on the outer side of the leading-edge apparatus 10, serves to protect against adverse mechanical effects on the heating layer 16 and the leading-edge main structure 14 arranged beneath or within it. The protective layer 18 can be designed, for example, as a lacquer, a paint, or a protective metal layer or can be of multilayered construction.

The electrically insulating coating 26 illustrated in FIG. 2 can have a thickness in the range of from 0.1 micrometer to 1 micrometer. The carbon fibers 24 can have, for example, a diameter of between 6 and 7 micrometers, so that a diameter of the conducting fibers 22 of approximately 7 to 8 micrometers results. The electrically insulating coating 26 is designed, for example, as a polymer electrolyte coating. Polymer electrolyte coatings of this kind can have a temperature resistance of at least 700 degrees Celsius, but at the same time offer outstanding bonding properties for incorporation into fiber-reinforced components.

Figure 3:
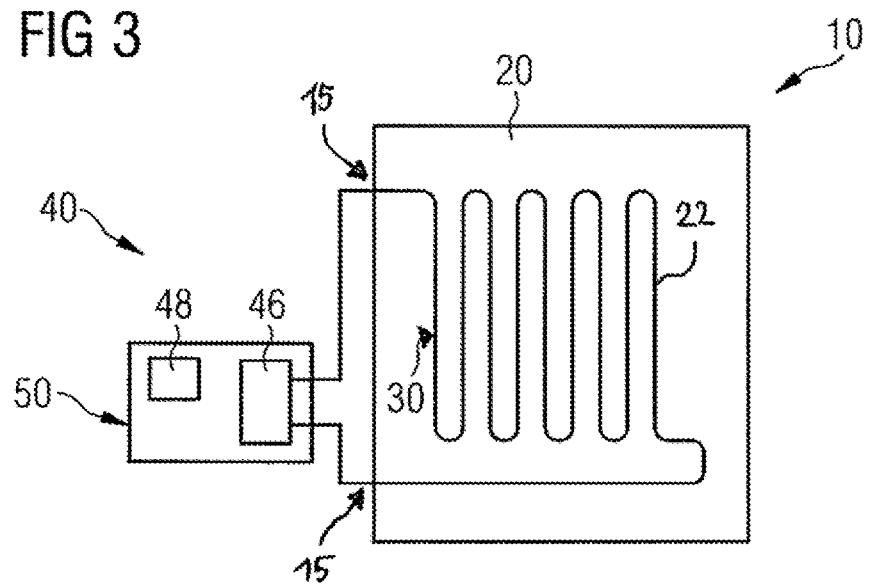
FIG. 3 shows a plan view of a leading-edge heating system according to the invention with a leading-edge apparatus.

FIG. 3 shows a leading-edge heating system 40 for an aircraft 12. The leading-edge heating system 40 comprises a leading-edge apparatus 10 and a power source 46 for providing electrical heating power. In FIG. 3, the fiber composite layer 20 of the leading-edge apparatus 10 is illustrated in rolled-up form by way of example. However, it goes without saying that the fiber composite layer 20 or the leading-edge main structure 14, not illustrated here but as illustrated in FIG. 1, can be in the form of a wing or tail unit leading edge. The power source 46 is electrically conductively connected to the leading-edge apparatus 10. The leading-edge heating system 40 furthermore has a control unit 50 with temperature sensors 48 by way of which the heating power of the power source 46 can be controlled. The current which is electrically conducted into the conducting fibers 22 can be continuously adjusted by the control unit 50 if there is a deviation from a desired setpoint temperature and it is desired to compensate for the deviation. The heating power can be selected by the control unit 50 in such a way that a surface temperature on an outer side 28 of the leading-edge apparatus 10 of between +1° C. and +10° C., in particular of between +3° C. and +6° C., is established.

The conducting fibers 22 are integrated into the fiber composite layer 20 such that they protrude out of the fiber composite layer 20 beyond the connection elements 15 at the end and can be electrically connected. The conducting fibers 22 form a closed electrical circuit 30, wherein the power source 46 is electrically conductively connected to the closed electrical circuit 30 by means of the connection elements 15.

In FIG. 3, the conducting fibers 22 which form the closed electrical circuit 30 are selected and illustrated, merely by way of example, in the form of a meandering and continuous individual fiber in the fiber composite layer 20. As an alternative, the form of the arrangement of the conducting fibers 22 in the fiber composite layer 20 can be selected from the group: fiber bundles, fiber tapes, laid fiber scrims, fiber mats, woven fiber fabric and nonwoven fiber fabric. In this case, it is then also possible, in principle, to realize a large number of closed electrical circuits 30 for heating the leading-edge apparatus 10.

Figure 4:
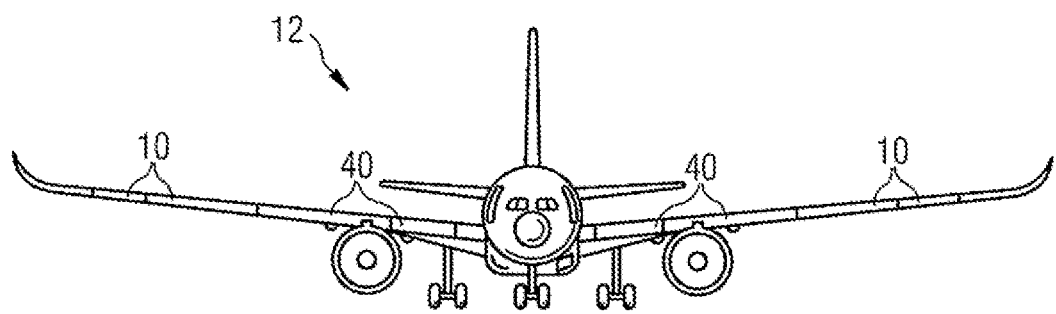
FIG. 4 shows an aircraft with a leading-edge heating system according to the invention and, respectively, a leading-edge apparatus according to the invention.

Finally, FIG. 4 shows an aircraft 12 into which a heatable leading-edge apparatus 10 and, respectively, a leading-edge heating system 40 are integrated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heatable leading-edge apparatus for an aircraft, comprising:
   a leading-edge main structure,
   a heating layer,
   the heating layer comprising a fiber composite layer with fibers and with a matrix which surrounds the fibers,
   the fibers being at least partially formed as conducting fibers configured to generate heat, and
   the conducting fibers each being formed as a carbo fiber with an electrically insulating coating which, within the matrix, completely surrounds the fibers.

2. The heatable leading-edge apparatus according to claim 1, wherein the conducting fibers form one or more closed electrical circuits.

3. The heatable leading-edge apparatus according to claim 1, wherein the insulating coating is a polymer coating.

4. The heatable leading-edge apparatus according to claim 3, wherein the polymer coating is a polymer electrolyte coating.

5. The heatable leading-edge apparatus according to claim 1, wherein a form of an arrangement of the conducting fibers in the fiber composite layer is selected from a group consisting of: individual fibers, fiber bundles, fiber tapes, laid fiber scrims, fiber mats, woven fiber fabric and nonwoven fiber fabric.

6. The heatable leading-edge apparatus according to claim 1, further comprising a protective layer.

7. The heatable leading-edge apparatus according to claim 6, wherein the protective layer is an outer erosion layer arranged on an outside of the leading-edge apparatus.

8. The heatable leading-edge apparatus according to claim 1, wherein the electrically insulating coating has a thickness in a range of from 0.1 micrometer to 1 micrometer.

9. The heatable leading-edge apparatus according to claim 1, wherein the conducting fibers are integrated in the fiber composite layer so that the conducting fibers protrude out of the fiber composite layer, at least at ends of the fibers.

10. A heatable leading-edge heating system for an aircraft, comprising:
    a leading-edge apparatus according to claim 1, and
    a power source providing electrical heating power, wherein the power source is electrically connected to the leading-edge apparatus.

11. The heatable leading-edge heating system according to claim 10, wherein the conducting fibers form one or more closed electrical circuits and the power source is electrically connected to the one or more closed electrical circuits.

12. The heatable leading-edge heating system according to claim 10, further having a control unit with temperature sensors, wherein the heating power of the power source can be controlled by the control unit and the temperature sensors.

13. The heatable leading-edge heating system according to claim 10, wherein the heating power is configured so that a surface temperature on an outer side of the leading-edge apparatus of between +1° C. and +10° C. is established.

14. The heatable leading-edge heating system according to claim 10, wherein the heating power is configured so that a surface temperature on an outer side of the leading-edge apparatus of between +3° C. and +6° C. is established.

15. An aircraft with a heatable leading-edge apparatus according to claim 1.

16. An aircraft with a leading-edge heating system according to claim 10.

* * * * *